though the United States Patent Office 3,261,853
Patented July 19, 1966

3,261,853
d-17β-CARBAMOYLMETHOXY-3-METH-
OXYESTRA-1,3,5(10)-TRIENE
Gerhard R. Wendt, Havertown, and Kurt W. Ledig,
Philadelphia, Pa., assignors to American Home Products Corporation, New York, N.Y., a corporation of
Delaware
No Drawing. Filed Nov. 3, 1964, Ser. No. 408,689
2 Claims. (Cl. 260—397.1)

The present invention is directed to certain novel steroids which, according to standard test procedures in warm blooded animals, are therapeutically active in the reduction of both blood serum cholesterol and blood sugar levels.

The claimed compounds are generally classified as 17β-carbamoylmethoxy - 3 - (lower)alkoxyestra - 1,3,5(10)-trienes and are represented by the following graphic structure:

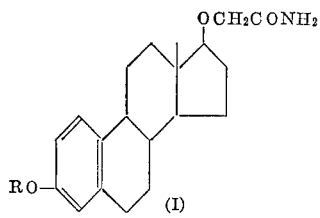

The symbol R in the above generic formula is intended to represent straight chain and branched lower alkyl groups containing up to about 5 carbon atoms in the chain, such as methyl, ethyl, propyl, butyl, isopropyl, isobutyl, pentyl and the like.

The claimed compounds are prepared by the reaction shown below:

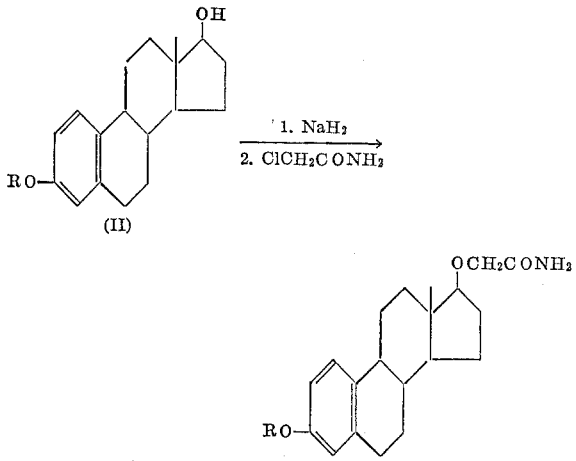

where R is as above defined.

In the reaction shown above, a readily available starting compound, a d-estradiol-3-(lower) alkyl ether (II), is refluxed in an inert solvent with sodium hydride in oil for about one hour. The reaction mixture is cooled to room temperature. Next, chloroacetamide is added to the reaction mixture and the solution is refluxed for about one hour. Water is then added to the mixture which is then acidified by adding a mineral acid, preferably 10% hydrochloric acid. The organic layer which forms is then separated. The product is recovered by chromatographic separation of the organic layer on neutral alumina in ether and elution with benzene-ethyl acetate. Purification of the crude product conveniently may be effected by recrystallization from methanol.

The claimed compounds can be administered in any dosage form suitable to achieve their pharmacological effect in mammals. When applied either alone or together with conventional pharmaceutical carriers, their effective dosages range from about 10 to 100 m./kilo of body weight of the subject treated regardless of the route of administration selected for dosage. When oral administration is intended such tablets or capsule forms as employed may be made up with conventional binders or excipients such as spray dried or crystalline lactose, corn starch, methyl cellulose and the like. On the other hand, if it is desired to prepare solutions or suspensions for injection such conventional extenders as water, non toxic alcohols and isotonic saline and the like may be employed.

The following specific examples are intended to illustrate but not limit the claimed invention.

Example 1 d-17β-carbamoylmethoxy-3-methoxyestra-1,3,5(10)-triene

A suspension of 5.0 g. of d-estradiol-3-methyl ether, 100 ml. of xylene, 3.9 g. of sodium hydride (50% in oil) was refluxed for one hour. The reaction mixture was cooled to room temperature and after the addition of 9.3 g. of chloroacetamide refluxed for one hour. Water was added followed by acidification with hydrochloric acid (10%). The organic layer was separated. Chromatographic separation of this layer on neutral alumina in ether and elution with benzene-ethyl acetate (1:1) gave the crude product which on recrystallization with methanol yielded 540 mg. of the purified product melting at 149–154°. (Found: C, 73.20; H, 8.20; N, 4.38. $C_{21}H_{29}O_3N$ requires C, 73.43; H, 8.51; N, 4.08%.)

When the procedure of Example I is applied to the starting materials listed below, the final products hereinafter disclosed are obtained:

| Starting Materials | Final Products |
|---|---|
| d-Estradiol-3-ethyl ether | d-17β-Carbamoylmethoxy-3-ethoxy-estra-1,3,5(10)-triene. |
| d-Estradiol-3-propyl ether | d-17β-Carbamoylmethoxy-3-propoxy-estra-1,3,5(10)-triene. |
| d-Estradiol-3-butyl ether | d-17β-Carbamoylmethoxy-3-butoxy-estra-1,3,5(10)-triene. |
| d-Estradiol-3-pentyl ether | d-17β-Carbamoylmethoxy-3-pentoxy-estra-1,3,5(10)-triene. |

What is claimed is:
1. A compound of the formula:

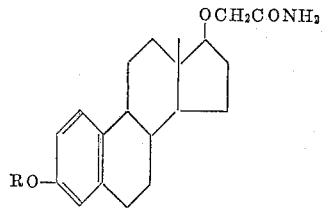

wherein R represents a lower alkyl group of 1 to 5 carbon atoms.
2. 17β-carbamoylmethoxy-3-methoxyestra - 1,3,5(10)-triene.

No references cited.

LEWIS GOTTS, Primary Examiner.
ELBERT L. ROBERTS, Examiner.